(No Model.) 2 Sheets—Sheet 1.
K. PETERS.
OPENING AND CLOSING DEVICE FOR BEER GLASSES.
No. 431,390. Patented July 1, 1890.
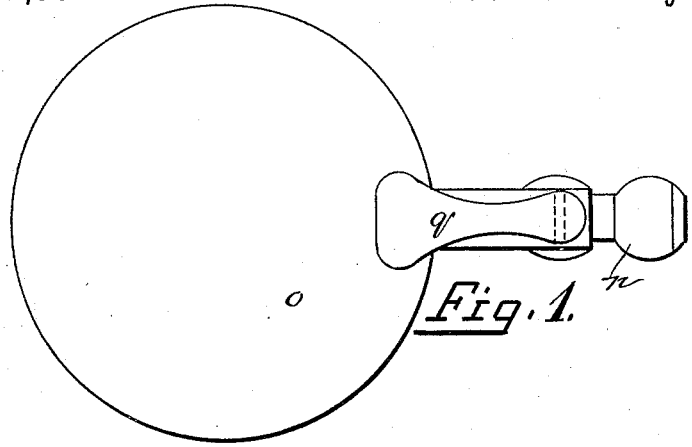
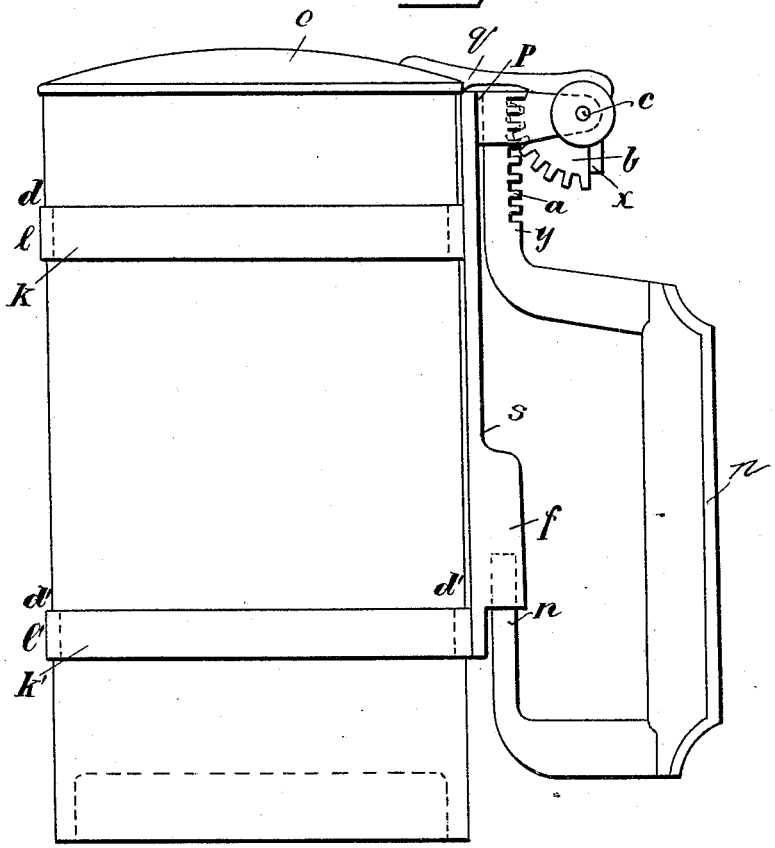
Witnesses
W. P. Keene.
James M. Spear
Inventor
Kathe Peters.
By Ellis Spear
Attorney (No Model.) 2 Sheets—Sheet 2.
K. PETERS.
OPENING AND CLOSING DEVICE FOR BEER GLASSES.
No. 431,390. Patented July 1, 1890.
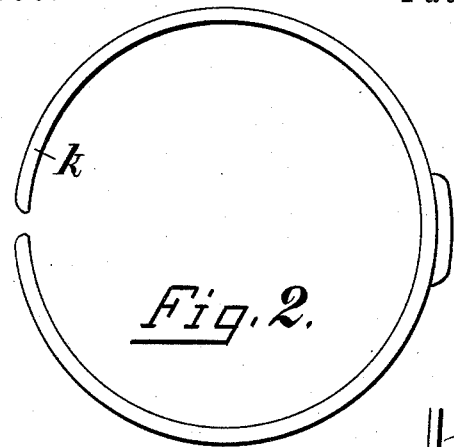
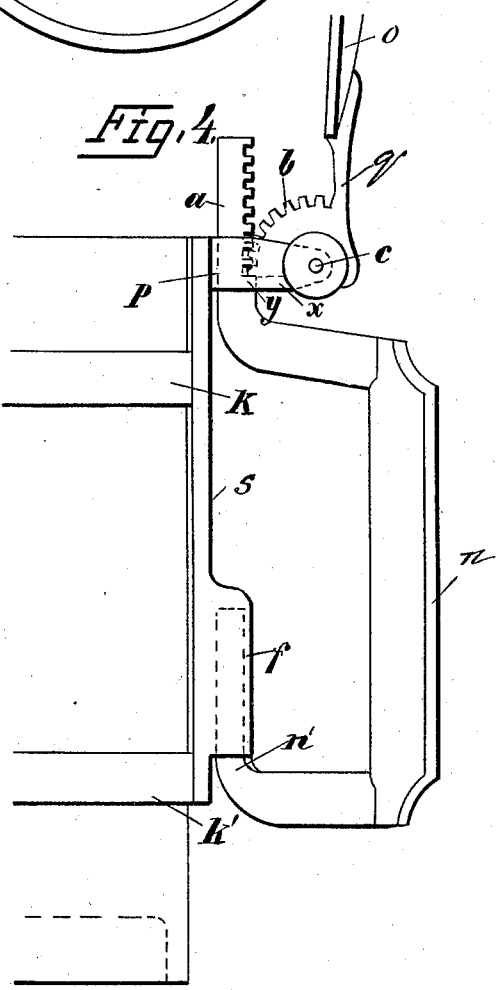
Witnesses
Inventor
Kathe Peters

UNITED STATES PATENT OFFICE.

KÄTHE PETERS, OF KIEL, GERMANY.

OPENING AND CLOSING DEVICE FOR BEER-GLASSES.

SPECIFICATION forming part of Letters Patent No. 431,390, dated July 1, 1890.

Application filed December 30, 1889. Serial No. 335,402. (No model.)

*To all whom it may concern:*

Be it known that I, KÄTHE PETERS, of Kiel, in the Kingdom of Prussia and German Empire, have invented a new and useful Beer-Glass with Automatic Opening and Closing Device, of which the following is a specification, reference being had therein to the accompanying drawings.

This invention relates to the securing of lids or covers to mugs, jugs, and the like in such a manner that when the vessel is taken up the lid or cover opens and when the vessel is set down the lid or cover closes automatically.

According to this invention I fix to the lid a toothed sector-gearing with a rack on a sliding handle, so that when the vessel is lifted the weight whereof causes the lid to open and when set down the weight of the handle closes it again automatically.

In the annexed drawings, Figure 1 shows plan of a beer-glass fitted with a lid constructed according to this invention; Fig. 2, a view of under side of spring-ring hereinafter referred to; Fig. 3, a side elevation of glass with lid closed; Fig. 4, a partial elevation of same with lid open.

$a$ is a toothed rack attached to or integral with the handle $n$, engaging with the sector $b$, attached to the lid $o$ by means of the lug $q$.

$c$ is the hinge.

K K are two spring-rings connected by a bar $s$, which bar has attached thereto two lugs P to carry the hinge-pin $c$. The bar $s$ also carries at its lower end a socket $f$, in which slides the guide-piece $n'$ of the handle $n$, which is bent upward for this purpose, the upper end of the handle being guided by the lugs P.

When the glass is raised, the handle first moves upward and the toothed sector turns into the position shown in Fig. 4, its motion being limited by the stop-shoulder $x$ coming in contact with the shoulder $y$ of the handle $n$. This opens the lid, and the hand firmly and securely holds the glass so that it can be freely moved in any direction. The handle $n$ is of such weight that it closes the lid $o$ when the glass is set down and the hand removed therefrom.

The lid is attached to the glass by means of the spring-rings K, which surround the glass, taking into grooves $l$ $l'$, provided for this purpose, the elasticity of the springs being sufficient to hold the glass securely. The springs are rectangular on their inside edges, to prevent the glass from moving up and down. To facilitate inserting a new glass, the edges of the grooves may be slightly countersunk.

I claim as my invention—

1. In combination, the vertically-sliding handle $n$, the supporting-frame therefor, the said handle having a rack at its upper end, and the cover hinged at $c$, and having a toothed segment in engagement with the rack of the handle, substantially as described.

2. In combination, the bar $s$, with means for securing it to the glass having arms P P at its upper end, a socket $f$ at its lower end, the vertically-movable handle having an upturned projection at its lower end, guided in said socket, and having its upper end guided by and between the arms $p$, the cover hinged in the arms P, and an operating connection between the cover and handle, substantially as described.

In witness whereof I have hereunto set my hand in presence of two witnesses.

KÄTHE PETERS.

Witnesses:
P. PETERS,
SIEGFRIED HARRIES.